US012756542B2

(12) United States Patent
Ikarashi

(10) Patent No.: US 12,756,542 B2
(45) Date of Patent: Oct. 6, 2026

(54) SECURE EXPONENT UNIFICATION SYSTEM, SECURE EXPONENT UNIFICATION APPARATUS, SECURE EXPONENT UNIFICATION METHOD, SECURE SUM COMPUTING SYSTEM, SECURE SUM-OF-PRODUCT COMPUTING SYSTEM, AND PROGRAM

(71) Applicant: NTT, Inc., Tokyo (JP)

(72) Inventor: Dai Ikarashi, Musashino (JP)

(73) Assignee: NTT, Inc., Tokyo (JP)

( * ) Notice: Subject to any disclaimer, the term of this patent is extended or adjusted under 35 U.S.C. 154(b) by 842 days.

(21) Appl. No.: 18/029,375

(22) PCT Filed: Oct. 16, 2020

(86) PCT No.: PCT/JP2020/039081

§ 371 (c)(1),
(2) Date: Mar. 30, 2023

(87) PCT Pub. No.: WO2022/079894

PCT Pub. Date: Apr. 21, 2022

(65) Prior Publication Data

US 2023/0359438 A1 Nov. 9, 2023

(51) Int. Cl.
*H04L 9/08* (2006.01)
*G06F 7/483* (2006.01)

(52) U.S. Cl.
CPC .............. *H04L 9/085* (2013.01); *G06F 7/483* (2013.01)

(58) Field of Classification Search
CPC ................................ H04L 9/085; G06F 7/483
See application file for complete search history.

(56) References Cited

U.S. PATENT DOCUMENTS

| | | | | |
|---|---|---|---|---|
| 9,325,499 | B1 * | 4/2016 | Juels | H04L 9/0861 |
| 11,080,665 | B1 * | 8/2021 | Poelstra | H04L 9/3013 |

(Continued)

OTHER PUBLICATIONS

Liina Kamm, et al., "Secure floating point arithmetic and private satellite collision analysis", International Journal of Information Security, vol. 14, No. 6, Dec. 18, 2014, 18 pages, XP035577326.

(Continued)

*Primary Examiner* — Gary S Gracia
(74) *Attorney, Agent, or Firm* — XSENSUS LLP

(57) ABSTRACT

Provided is a secure computation technique for efficiently uniforming exponent parts of floating points. A secret exponent part uniforming system which, from a share $([[\vec{a}]]^P, [[\vec{\rho}]]^Q)$ of a floating point vector $(\vec{a}=(a_0, \ldots, a_{m-1}), \vec{\rho}=(\rho_0, \ldots, \rho_{m-1}))$, calculates a share $([[\vec{b}]]^P, [[\vec{\rho}_{max}]]^Q)$ of a floating point vector with uniformed exponent parts $(\vec{b}=(b_0, \ldots, b_{m-1}), \vec{\rho}_{max}=(\rho_{max}, \ldots, \rho_{max})$ $(\rho_{max}=\max\{\rho_0, \ldots, \rho_{m-1}\})$, $2^{\rho\_i}a_i \approx 2^{\rho\_max}b_i$ is satisfied), comprises a mantissa part calculation means for calculating a share $[[\vec{b}]]^P$ by calculating a share $[[b_i]]^P$ $(b_i=2^{-\rho\_dif,i}a_i)$ of the number $b_i$ from the i-th element of the share $[[\vec{a}]]^P$ and the i-th element of a share $\langle\langle\vec{\rho}_{dif}\rangle\rangle^Q$ converted by replicated secret sharing from a share $[[\vec{\rho}_{dif}]]^Q=[[\vec{\rho}]]-[[\vec{\rho}_{max}]]^Q$.

7 Claims, 7 Drawing Sheets

(56) References Cited

U.S. PATENT DOCUMENTS

| | | | | |
|---|---|---|---|---|
| 12,166,864 | B2 * | 12/2024 | Ikarashi | H04L 9/3006 |
| 2010/0250497 | A1 * | 9/2010 | Redlich | G06Q 10/06 707/661 |
| 2011/0219208 | A1 * | 9/2011 | Asaad | G06F 9/06 712/12 |
| 2013/0142323 | A1 * | 6/2013 | Chiarella | G06F 7/58 380/28 |
| 2014/0112473 | A1 * | 4/2014 | Gassi | H04L 9/06 380/255 |
| 2014/0250300 | A1 * | 9/2014 | Runkis | H04L 9/0894 713/165 |
| 2015/0227747 | A1 * | 8/2015 | Gassi | G06F 21/602 713/193 |
| 2016/0358165 | A1 * | 12/2016 | Maxwell | H04L 9/50 |
| 2017/0149796 | A1 * | 5/2017 | Gvili | H04L 63/0428 |
| 2020/0046902 | A1 * | 2/2020 | Chuang | A61M 5/2053 |
| 2020/0153618 | A1 * | 5/2020 | Bhattacharya | H04L 9/0841 |
| 2020/0304293 | A1 * | 9/2020 | Gama | H04L 9/00 |
| 2020/0374107 | A1 * | 11/2020 | Tsuchida | G06F 21/6218 |
| 2021/0058241 | A1 * | 2/2021 | Georgieva | H04L 9/085 |
| 2021/0176252 | A1 * | 6/2021 | Tsuchida | H04L 9/085 |
| 2021/0256162 | A1 * | 8/2021 | Liphardt | G06F 21/6245 |
| 2022/0417003 | A1 * | 12/2022 | Giacomelli | H04L 9/085 |
| 2023/0336567 | A1 * | 10/2023 | Gvili | H04L 63/0428 |
| 2023/0359438 | A1 * | 11/2023 | Ikarashi | H04L 9/085 |
| 2023/0379151 | A1 * | 11/2023 | Ikarashi | H04L 9/3033 |
| 2023/0401033 | A1 * | 12/2023 | Ikarashi | G06F 5/012 |

OTHER PUBLICATIONS

Amada et al., "Multiparty Computation for Floating Point Arithmetic with Less Communication over Small Fields", Information Processing Society of Japan, Journal of Information Processing, vol. 60, No. 9, Sep. 2019, pp. 1433-1447 (30 pages including English Translation).

Jaak Randmets, "Programming Languages for Secure Multi-party Computation Application Development", PhD thesis. Dissertationes Mathematicae Universitatis Tartuensis, University of Tartu, vol. 113, 2017, pp. 1-172.

* cited by examiner

SECURE EXPONENT UNIFICATION SYSTEM, SECURE EXPONENT UNIFICATION APPARATUS, SECURE EXPONENT UNIFICATION METHOD, SECURE SUM COMPUTING SYSTEM, SECURE SUM-OF-PRODUCT COMPUTING SYSTEM, AND PROGRAM

CROSS-REFERENCE TO RELATED APPLICATION

The present application is based on PCT filing PCT/JP2020/039081, filed Oct. 16, 2020, the entire contents of which are incorporated herein by reference.

TECHNICAL FIELD

The present invention relates to a secure computation technique, and more particularly, to a technique for performing a plurality of exponent part uniforming operations of floating points in secure computation.

BACKGROUND ART

The secure computation is a method for obtaining a result of a designated operation without restoring an encrypted numerical value, (for example, refer to a reference non-patent document 1). In the method of the reference non-patent document 1, encryption is performed in which a plurality of pieces of information capable of restoring a numerical value are shared to three secure computation apparatuses, and addition/subtraction, constant sum, multiplication, constant multiplication, boolean operation (negation, logical product, logical sum, exclusive or), data form conversion (integer, binary number) can be held in a state of being shared in the three secure computation apparatuses, that is, in an encrypted state. In general, the number of sharing is not limited to 3, and can be set to W (W can be a predetermined constant of 3 or more), and a protocol for realizing secure computation by cooperative calculation by W secure computation apparatuses is called a multi-party protocol.

(Reference non-patent document 1: Koji Chida, Koki Hamada, Dai Igarashi, and Katsumi Takahashi, "Reconsideration of Lightweight Verifiable Three-Party Secure Function Evaluation", In CSS, 2010.)

Conventionally, there are NPL 1 and NPL 2 as references related to protocols and implementation of secure computation for performing floating point calculation. In order to calculate the sum of the floating points, it is necessary to uniform the exponent parts of the floating points to be added.

CITATION LIST

Non Patent Literature

[NPL 1] Takuma Amada, Masahiro Nara, Takashi Nishide, Hiroshi Yoshiura, "Multiparty Computation for Floating Point Arithmetic with Less Communication over Small Fields," IPSJ Journal, vol. 60, No. 9, pp. 1433-1447, 2019.

[NPL 2] Randmets, J., "Programming Language for Secure Multi-party Computation Application Development," PHD thesis. University of Tartu, 2017.

SUMMARY OF INVENTION

Technical Problem

However, there is a problem that the method of uniforming the exponent parts of the floating points while keeping the secrecy is poor in efficiency.

Hence, an object of the present invention is to provide a secure computation technique for effectively uniforming the exponent parts of the floating points.

Solution to Problem

One aspect of the present invention is a secret exponent uniforming system where P is a prime number and Q is an order of a residue ring, the secret exponent part uniforming system which is comprised of three or more pieces of secret exponent part uniforming apparatuses and calculates, from a share $([[\vec{a}]]^P, [[\vec{\rho}]]^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), a share $([[\vec{b}]]^P, [[\vec{\rho}_{max}]]^Q)$ of a floating point vector $(\vec{b}, \vec{\rho}_{max})$ obtained by uniforming exponent parts of the floating point vector $(\vec{a}, \vec{p})$ (provided that $\vec{b}=(b_0, b_1, \ldots, b_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i \approx 2^{\rho\_max}b_i$ $(0 \le i < m)$ is satisfied), the secret exponent part uniforming system comprising:

a maximum value calculation means for calculating a share $[[\rho_{max}]]^Q$ from the share $[[\vec{\rho}]]^Q$;

a difference calculation means for calculating a share $[[\vec{\rho}_{dif}]]^Q=[[\vec{\rho}]]^Q-[[\vec{\rho}_{max}]]^Q$ from the share $[[\vec{\rho}]]^Q$ and the share $[[\rho_{max}]]^Q$;

a mantissa part calculation means for calculating a share $[[\vec{b}]]^P=([[b_0]]^P, [[b_1]]^P, \ldots, [[b_{m-1}]]^P)$ from the share $[[\vec{a}]]^P$ and the share $[[\vec{\rho}_{dif}]]^Q$, for i which is satisfied $0 \le i < m$, by calculating a share $[[b_i]]^P$ (provided that $b_i=2^{-\rho\_dif,i}a_i$) of the number $b_i$ which is obtained by $-\rho_{dif,i}$ bit shift of the number $a_i$, from the i-th element $[[a_i]]^P$ of the share $[[\vec{a}]]^P$ and the i-th element $\langle\langle\rho_{dif,i}\rangle\rangle^Q$ of a share $\langle\langle\vec{\rho}_{dif}\rangle\rangle^Q$ converted by replicated secret sharing from the share $[[\vec{\rho}_{dif}]]^Q$; and an output means for generating the share $([[\vec{b}]]^P, [[\vec{\rho}_{max}]]^Q)$ from the share $[[\vec{b}]]^P$ and the share $[[\vec{\rho}_{max}]]^Q$.

Advantageous Effects of Invention

According to the present invention, the exponent part of the floating point can be efficiently uniformed while keeping confidentiality.

DESCRIPTION OF EMBODIMENTS

Figure 1:
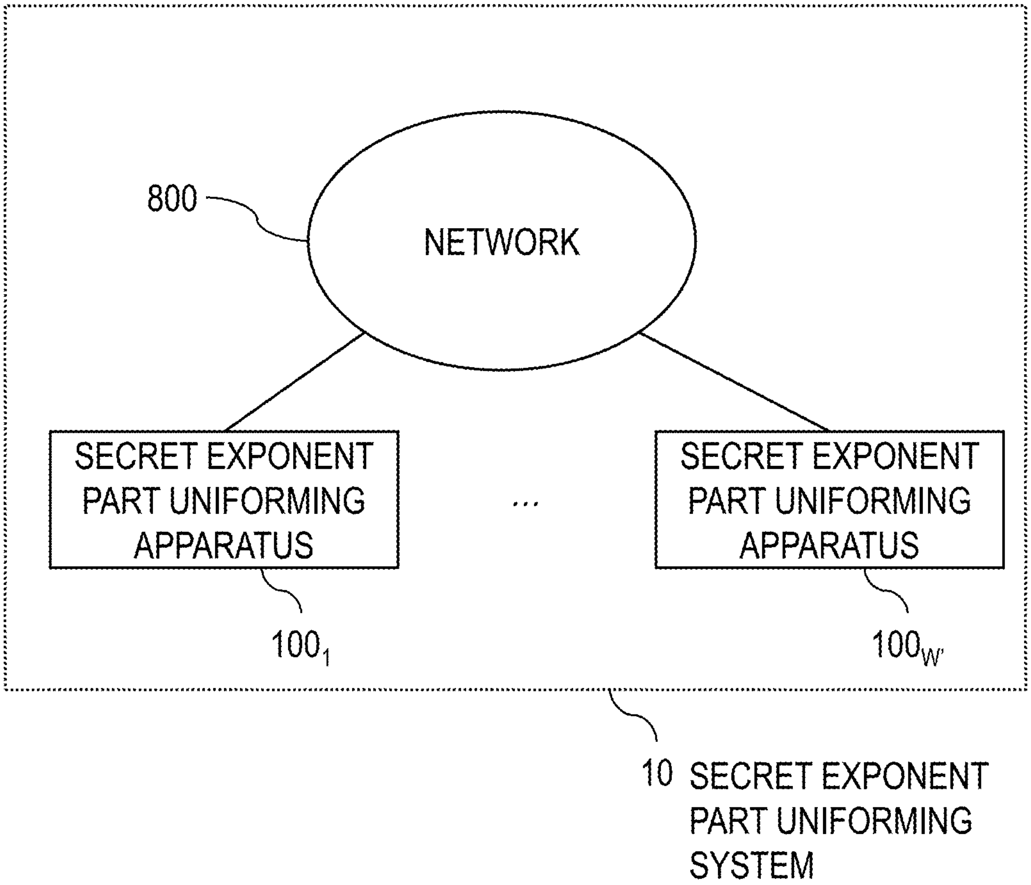
FIG. 1 is a block diagram illustrating a configuration of a secret exponent part uniforming system 10.

Hereinafter, embodiments of the present invention will be described in detail. Further, constituent units having the same function are denoted with the same number, and overlapping descriptions thereof are omitted.

Prior to the description of each embodiment, the notation in the present specification will be explained.

^(caret) indicates a superscript. For example, $x^{y^{\wedge}z}$ means that $y^z$ is a superscript to x, and $x_{y^{\wedge}z}$ means that $y^z$ is a subscript to x. Further, _ (under score) indicates a subscript. For example, $x^{y\_z}$ indicates that $y_z$ is a superscript to x, and $x_{y\_z}$ indicates that $y_z$ is a subscript to x.

Superscripts of a letter x, such as "^" and "~" in ^x and ~x, are to be written directly above "x", but these are written as ^x and ~x due to constraints of notation in the specification.

TECHNICAL BACKGROUND

The secure computation in each embodiment of the present invention is constructed using an existing secure computation protocol. Hereinafter, a notation will be described.

<<Notation>>

P is a prime number. For example, it is preferable to set the Mersenne prime number $P=2^{61}-1$. p is a number of bits of the prime number P. It should be noted that p=|P| may be expressed. When P is a Mersenne prime number, p is a prime number. For example, if $P=2^{61}-1$, p=61 is obtained. Also, Q is an order of a residue ring. The order Q is used as the prime number P and its bit number p. The order Q can be used for a exponent part of a floating point. When the order Q is used for an exponent part of a floating point, $Q=2^{13}-1$, for example.

It is assumed that k is a threshold of a secret sharing. For example, it is preferable to set k=2. And n is s sharing number of secret sharing (that is, a number of parties of secure computation). For example, it is preferable to set n=3.

$[[X]]^y$ represents a share in which a mod y element x is (k, n)-secret shared. As a method of secret sharing, for example, Shamir secret sharing or replicated secret sharing can be used. In the following, The share of (k, n)-replicated secret sharing for the mod y element x is expressed by $<<x>>^y$. Since (k, n)-replicated secret sharing is (k, n)-secret sharing, a protocol applicable to (k, n)-secret sharing can be applied to (k, n)-replicated secret sharing. When a share is expressed as $<<x>>^y$, it means that the property of the replicated secret sharing is utilized. In particular, (k, k)-replicated secret sharing is called (k, k)-additive secret sharing. The mod y element x is expressed as a share $<x>^y$ in which (k, k)-additive secret sharing is performed. It is to be noted that because double brackets are typically used in patent amendments to delete the subject matter between the double brackets, the claims are written to use double parenthesis and instead of double brackets used throughout the specification. Therefore, double parenthesis within the claims mean the same as double brackets described herein.

$[[x]]^{2^{\wedge}m}$ represents a share in which m shares in the form of $[[x]]^2$ are arranged. In some cases, $[[x]]^{2^{\wedge}m}$ is regarded as a bit representation of a number.

x≈y indicates that x and y are equal as real numbers on the computer. That is, the difference between x and y is within a certain error range.

For two numbers a, d, a/d represents the value of integer division for truncating the decimal part. Therefore, the integer division by the number of powers of 2 is equivalent to the right shift, and $(a/d)_{Re}$ represents the value of real number division for the two numbers a, d.

For the number a, ceiling (a) represents the minimum integer of a or more.

(prop) represents 1 when proposition prop is established, and 0 when proposition prop is not established. For example, (1>0) is 1.

A floating point $2^b a$, (provided that a and b represent a mantissa part and an exponent part respectively), are represented as a floating point (a, b). Further, m floating points $2^{b\_0}a_0, 2^{b\_1}a_1, \ldots, 2^{b\_m-1}a_{m-1}$ (provided that $a_i$, $b_i$ ($0 \leq i < m$) represent a mantissa part and an exponent part respectively), are represented as a floating point vector (→a, →b) (provided that $\rightarrow a=(a_0, a_1, \ldots, a_{m-1})$, $\rightarrow b=(b_0, b_1, \ldots, b_{m-1})$). In some cases, the length m of the vector $\rightarrow a=(a_0, a_1, \ldots, a_{m-1})$ may be expressed as |→a|.

<<Existing Secure Computation Protocol>>

First, existing secure computation protocols used in the present invention will be described. For addition and subtraction, constant sum, multiplication, constant multiplication, a boolean operation (negation, logical product, logical sum, exclusive or), data form conversion (integer, binary number), calculation of the exponential function, existing secure computation protocols are used. The following protocols are used as existing protocols used in the present invention.

[the Conversion from (k, n)-Secret Sharing (Replicated Secret Sharing) to (k, k)-Additive Secret Sharing]

Input: a share $[[x]]^y$ of value x (a share $<<x>>^y$ of value x).

Output: a share $<x>^y$ of value x.

Specifically, there is a method described in reference non-patent document 2.

(Reference non-patent document 2: Kikuchi, R., Ikarashi, D., Matsuda, T., Hamada, K. and Chida, K., "Efficient Bit-Decomposition and Modulus-Conversion Protocols with an Honest Majority," 23rd Australasian Conference on Information Security and Privacy (ACISP 2018), Lecture Notes in Computer Science, Vol. 10946, Springer, pp. 64-82, 2018.)

[the Conversion from (k, k)-Additive Secret Sharing to the (k, n)-Secret Sharing (Replicated Secret Sharing)]

Input: a share $<x>^y$ of value x.

Output: a share $[[x]]^y$ of value x (a share $<<x>>^y$ of value x).

Specifically, there is a method described in reference non-patent document 2.

[Mod 2→Mod q Conversion]

Input: a share $[[x]]^2$ of value x (a share $<<x>>^2$ of value x).

Output: a share $[[x]]^q$ of value x (a share $<<x>>^q$ of value x).

Specifically, there is a method described in reference non-patent document 2.

[Shift Amount Public Right Shift]

Input: a share $[[x]]^q$ of value x, a shift amount ρ

Output: a share $[[x/2^\rho]]^q$ of a value obtained by shifting value x to the right by ρ bits Specifically, there is a method described in reference non-patent document 3.

(Reference non-patent document 3: Ibuki Mishina, Dai Igarashi, Koki Hamada, Ryo Kikuchi, "Designs and Implementations of Efficient and Accurate Secret Logistic Regression," CSS2018, 2018.

[Bulk Shift Amount Public Right Shift]

Input: a share $[[x]]^q$ of value x, shift amounts $\rho_0, \ldots, \rho_{m-1}$

Output: shares $[[x/2^{\rho\_0}]]^q, \ldots, [[x/2^{\rho\_m-1}]]^q$ of values which are obtained by right-shifting of value x by $\rho_0$ bit, ..., $\rho_{m-1}$ bit.

Specifically, there is a method described in reference non-patent document 4.

(Reference non-patent document 4: Dai Igarashi, "Elementary functions more than M op/s in the secure computation," SCIS2020, 2020.)

As a self-evident method, bulk shift amount public right shift can be formed by repeating shift amount public right shift.

[Modulus Conversion Using Quotient Transfer]

Input: a share $\langle\langle x\rangle\rangle^q$ of value x.

Output: a share $\langle\langle x\rangle\rangle^r$ of value x.

Specifically, there is a method described in reference non-patent document 2.

[Bit Decomposition]

Input: a share $[[x]]^q$ of value x.

Parameter: a maximum number M of bits of input values.

Output: a share $[[x]]^{2\wedge M}$ of value x.

Specifically, there is a method described in reference non-patent document 2.

<<Secure Computation Protocol of the Present Invention>>

Next, the secure computation protocols of the present invention will be described.

[Multiplicative Rotation (Shift Amount Concealment Left Shift)]

Input: a share $[[a]]^P$ of value a, a share $\langle\langle\rho\rangle\rangle^P$ of a rotation amount (shift amount) $\rho(\geq 0)$.

Output: a share $[[2^\rho a]]^P$ of a value obtained by left-shifting value a by p bits.

Although the share to be output can be calculated by using a protocol of multiplication or exponential function calculation, the share can be calculated by using a method using the idea of the random conversion (refer to reference non-patent document 5). As a specific example, a case where n=3 will be described.

(Reference non-patent document 5: Dai Igarashi, Koki Hamada, Ryo Kikuchi, Koji Chida, "The improvement of the secure computation basic sort directed to statistical processing of 1 second of response to the Internet environment," SCIS2014, 2014.

(Round 1)

step1: A share $[[a]]^P$ is converted into (k, k)-additive secret share $\langle a\rangle^P$ which party 0 and party 1 have.

step2: The party 0 and the party 1 share a random number $r_{01}$. The parties 1 and 2 share a random number $r_{12}$.

step3: The party 0 calculates $b_0=2^{(\langle\langle\rho\rangle\rangle\wedge p)\_01}\langle a\rangle^P{}_0-r_{01}$ and sends $b_0$ to the party 2.

Here, $\langle\langle\rho\rangle\rangle^p{}_{01}$ represents a share held by the party 0 and the party 1 with respect to the share $\langle\langle\rho\rangle\rangle^P$. In addition, $\langle a\rangle^P{}_0$ represents a share held by the party 0 with respect to the share $\langle a\rangle^P$.

step4: The party 1 calculates $b_1=2^{(\langle\langle\rho\rangle\rangle\wedge p)\_12}(2^{(\langle\langle\rho\rangle\rangle\wedge p)\_01}\langle a\rangle^P{}_1+r_{01})-r_{12}$, and sends $b_1$ to the party 0.

Here, $\langle\langle\rho\rangle\rangle^p{}_{12}$ represents a share held by the party 1 and the party 2 with respect to the share $\langle\langle\rho\rangle\rangle^P$. In addition, $\langle a\rangle^P{}_1$ represents a share held by the party 1 with respect to the share $\langle a\rangle^P$.

(Round 2)

step5: The party 0 calculates $\langle c\rangle^P{}_0=2^{(\langle\langle\rho\rangle\rangle\wedge p)\_20}b_1$.

Here, $\langle\langle\rho\rangle\rangle^p{}_{20}$ represents a share held by the party 2 and the party 0 with respect to the share $\langle\langle\rho\rangle\rangle^P$.

Step6: The party 2 calculates $\langle c\rangle^P{}_2=2^{(\langle\langle p\rangle\rangle\wedge p)\_20}(2^{(\langle\langle\rho\rangle\rangle\wedge p)\_12}b_0+r_{12})$.

(Round 3)

Step7: A share $\langle c\rangle^P$ is converted into (k, k)-secret share $[[c]]^P$.

Here, $c=2^\rho a$ is established.

[Shift Amount Concealment Right Shift]

Input: a share $[[a]]^P$ of value a, a share $\langle\langle\rho\rangle\rangle^p$ of a shift amount ρ.

Parameter: an upper limit value M of shift amount.

Provided that, $0\leq\rho\leq M$, a value $2^M a$ obtained by left-shifting value a by M bits does not overflow.

Output: a share $[[a/2^\rho]]^P$ of a value obtained by right-shifting value a by p bits.

Step1: calculate $\langle\langle M-\rho\rangle\rangle^P$.

Step2: By using multiplicative rotation, calculate a share $[[2^{M-\rho}a]]^P$ of a value obtained by left-shifting value a by M-p bits.

Step3: By using shift amount public right shift, a share $[[a/2^\rho]]^P=[[2^{M-\rho}a/2^M]]^P$ of a value obtained by right-shifting a value $2^{M-\rho}a$ to by M bits is calculated.

[Shift Amount Concealment Shift (Part 1)]

Input: a share $[[a]]^P$ of value a, a share $\langle\langle\rho\rangle\rangle^Q$ of a shift amount ρ (provided that when $\rho\geq 0$ left-shifting is represented, when $\rho<0$ right-shifting is represented).

Parameter: an upper limit value M which can be taken by the position of the MSB (Most Significant Bit) of input values. Output: a share $[[s]]^P$ of value s obtained by shifting value a by ρ bits.

Here, $s=2^\rho a$ is established.

Step1: A share $\langle\langle\rho\rangle\rangle^P$ is calculated by using modulus conversion. For example, a modulus conversion using the above-mentioned quotient transfer can be used for the modulus conversion.

Step2: $[[f_L]]^2=[[(\rho\geq 0)]]^2$ is calculated by size comparison.

Step3: By using mod 2→mod p conversion, $\langle\langle f_L\rangle\rangle^P$ is calculated.

Step4: $\langle\langle\rho'\rangle\rangle^P=\langle\langle\rho\rangle\rangle^P+M-M\langle\langle f_L\rangle\rangle^P$ is calculated.

Step5: $[[b]]^P=[[2^{\rho'}a]]^P$ is calculated by using multiplicative rotation.

Step6: $[[c]]^P=[[2^{\rho'}a/2^M]]^P$ is calculated by using shift amount public right shift.

Step7: $[[f_L]]^P$ is calculated by using mod 2→mod P conversion.

Step8: $[[s]]^P=[[c]]^P+([[b]]^P-[[c]]^P)[[f_L]]^P$ is calculated.

This expression is a selection gate, so that s=c when $\rho<0$, and s=b when $\rho\geq 0$.

[Shift Amount Concealment Shift (Part 2)]

Input: a share $[[a]]^P$ of value a, a share $\langle\langle\rho\rangle\rangle^Q$ of a shift amount ρ (provided that when $\rho\geq 0$ left-shifting is represented, when $\rho<0$ right-shifting is represented).

Parameter: an upper limit value M which can be taken by the MSB position of input values, an upper limit value M' of the MSB position allowed by shares.

Output: a share $[[s]]^P$ of value s obtained by shifting value a by ρ bits.

Here, $s=2^\rho a$ is established.

Step1: $u=M'-M+1$, $d=\mathrm{ceiling}(((M-1)/u)_{Re})$ are calculated.

Here, u is the right shift amount which can be covered by one shift amount concealment right shift (specifically, the amount in the range of M'-M bits from 1), and d is the number of execution times of the shift amount concealment right shift necessary for performing the right-shifting in the range of 1 to M−1 bits.

Step2: A share $\langle\langle\rho\rangle\rangle^{P}$ is calculated by using modulus conversion. For example, a modulus conversion using the above-mentioned quotient transfer can be used for the modulus conversion.

Step3: By size comparison, $[[f_0]]^2=[[(\rho\geq -M+1)]]^2$, $[[f_1]]^2=[[(\rho\geq -M+1+u)]]^2, \ldots, [[f_{d-1}]]^2=[[(\rho\geq -M+1+(d-1)u)]]^2$, $[[f_L]]^2=[[(\rho\geq 0)]]$ are calculated.

In this case, if is $f_L$; $f_{d-1}$, if is $f_{d-1}$; $f_{d-2}, \ldots$ are established. The above-mentioned characteristics of $f_0, f_1, \ldots, f_{d-1}, f_L$ are referred to as transitive flags.

step4: BY using mod 2→mod p conversion, $\langle\langle f_1\rangle\rangle_{p}$, $\langle\langle f_2\rangle\rangle_{p}, \ldots, \langle\langle f_{d-1}\rangle\rangle^{P}, \langle\langle f_L\rangle\rangle^{P}$ are calculated.

In this step, the calculation of $\langle\langle f_0\rangle\rangle^{P}$ is not required.

step5: $\langle\langle\rho'\rangle\rangle_{p}=\langle\langle\rho\rangle\rangle^{P}+M-1-u(\Sigma_{i\leq i<d}\langle\langle f_i\rangle\rangle^{P})+((d-1)u-M+1)\langle\langle f_L\rangle\rangle^{P}$ is calculated.

Step6: By using multiplicative rotation, $[[b]]^P=[[2^{\rho'}a]]^P$ is calculated.

step7: By using bulk shift amount public right shift, $[[c_0]]^P=[[2^{\rho'}a/2^{M-1}]]^P$, $[[c_1]]^P=[[2^{\rho'}a/(2^{M-1-u})]]^P, \ldots, [[c_{d-1}]]^P=[[2^{\rho'}a/(2^{M-1-(d-1)u})]]^P$ are calculated.

step 8: By using mod 2→mod P conversion, $[[f_0]]^P$, $[[f_1]]^P, \ldots, [[f_{d-1}]]^P, [[f_L]]^P$ are calculated.

In this step, the calculation of $[[f_0]]^P$ is necessary.

step9: $[[s]]^P=[[c_0]]^P[[f_0]]^P+([[c_1]]^P-[[c_0]]^P)[[f_1]]^P+\ldots+([[c_{d-1}]]^P-[[c_{d-2}]]^P)[[f_{d-1}]]^P+([[b]]^P-[[c_{d-1}]]^P)[[f_L]]^P$ is calculated.

This expression is a selection gate for transitive flags $f_0, f_1, \ldots, f_{d-1}, f_L$, and s=0 when $f_0, f_1, \ldots, f_{d-1}, f_L$ are all 0, $s=c_0$ when $f_0$, $S=c_1$ when $f_1, \ldots$, s=b when $f_L$.

[Shift Amount Concealment Shift (Part 3)]

Input: a share $[[a]]^P$ of value a, a share $\langle\langle\rho\rangle\rangle^{Q}$ of a shift amount ρ (provided that when ρ≥0 left-shifting is represented, when ρ<0 right-shifting is represented).

Parameter: an upper limit value M which can be taken by the MSB position of input values, an upper limit value M' of the MSB position allowed by shares.

Output: a share $[[s]]^P$ of value s obtained by shifting value a by ρ bits.

Here, $s=2^{\rho}a$ is established.

Step1: It is assumed that u is an integer satisfying u≤M'−M+1. Further, [R, R'] is the range of the right shift amount covered by the divided right shift, and d is an integer satisfying d≥ceiling $(((R'-R+1)/u)_{Re})$.

Hereinafter, $\{\ \}_L$ indicates that when the shift amount larger than −R need not be taken into consideration (for example, when it is known that the shift is right shift), the calculation of the portion surrounded by the parentheses can be omitted. In addition, $\{\ \}_0$ indicates that, when the shift amount smaller than −R' is not required to be considered (for example, when it is found that the right shift amount is larger than the value to which the shift amount concealment shift (part 1) can be applied but is not an extremely large value), the calculation of the part surrounded by the parentheses can be omitted.

Step2: A share $\langle\langle p\rangle\rangle^{P}$ is calculated by using modulus conversion. For example, a modulus conversion using the above-mentioned quotient transfer can be used for the modulus conversion.

Step3: By size comparison, $\{[[f_0]]^2=[[(\rho\geq -R')]]^2,\}_0$ $[[f_1]]^2=[[(\rho\geq -R'+u)]]^2, \ldots, [[f_{d-1}]]^2=[[(\rho\geq -R'+(d-1)u)]]^2\{$, $[[f_L]]^2=[[(\rho\geq -R+1)]]^2\}_L$ are calculated.

In this case, if is $f_L$; $f_{d-1}$, if is $f_{d-1}$; $f_{d-2}, \ldots$ are established.

The above-mentioned characteristics of $f_0, f_1, \ldots, f_{d-1}$, ff are referred to as transitive flags.

step4: By using mod 2→mod p conversion, $\langle\langle f_1\rangle\rangle^{P}$, $\langle\langle f_2\rangle\rangle^{P}, \ldots, \langle\langle f_{d-1}\rangle\rangle^{P}\{, \langle\langle f_L\rangle\rangle^{P}\}_L$ are calculated.

step5: $\langle\langle\rho'\rangle\rangle^{P}=\langle\langle\rho\rangle\rangle^{P}+R'-u(\Sigma_{1\leq i<d}\langle\langle f_i\rangle\rangle^{P})\{+((d-1)u-R')\langle\langle f_L\rangle\rangle\}_L$ is calculated.

step6: By using multiplicative rotation, $[[b]]^P=[[2^{\rho'}a]]^P$ is calculated.

step7: By using bulk shift amount public right shift, $\{[[c_0]]^P=[[2^{\rho}a/2^{R'}]]^P,\}_0[[c_1]]^P=[[2^{\rho'}a/(2^{R'-u})]]^P, \ldots, [[c_{d-1}]]^P=[[2^{\rho'}a/(2^{R'-(d-1)u})]]^P$ are calculated.

step8: By using mod 2→mod P conversion, $\{[[f_0]]^P,\}_0$ $[[f_1]]^P, \ldots, [[f_{d-1}]]^P\{, [[f_L]]^P\}_L$ are calculated.

step9: $[[s]]^P=\{[[c_0]]^P[[f_0]]^P+(\}_0[[c_1]]^P\{-[[c_0]]^P)\}_0$ $[[f_1]]^P+\ldots+([[c_{d-1}]]^P-[[c_{d-2}]]^P)[[f_{d-1}]]^P\{+([[b]]^P-[[c_{d-1}]]^P)[[f_L]]^P\}$ is calculated.

This expression is a selection gate for transitive flags $f_0, f_1, \ldots, f_{d-1}, f_L$, and s=0 when $f_0, f_1, \ldots, f_{d-1}, f_L$ are all 0, $s=c_0$ when $f_0$, $S=c_1$ when $f_1, \ldots$, s=b when $f_L$.

When R=1, R'=M−1, u=M'−M+1, d=ceiling$(((R'-R+1)/u)_{Re})$, the shift amount concealment shift (part 3) becomes the shift amount concealment shift (part 2). Therefore, the shift amount concealment shift (part 3) is a protocol generalized the shift amount concealment shift (part 2).

[Maximum Value Calculation]

Input: a share $[[\vec{a}]]^Q$ of vector $\vec{a}$, (provided that $\vec{a}=(a_0, a_1, \ldots, a_{m-1})$, $a_i$ (0≤i<m) are bit representation integers.

Parameter: a maximum number M of bits of input values.

Output: a share $[[a_{max}]]^Q$ of the maximum value $a_{max}$ (provided that $a_{max}=\max\{a_0, a_1, \ldots, a_{m-1}\}$).

Step1: A share $[[a_{max,M-1}]]^Q$ of $a_{max,M-1}$ which is an OR of the most left bit $a_{i,M-1}$ (0≤i<m) of $a_i$ (0≤i<m) (provided that $a_{max,M-1}=a_{0,M-1}$ OR $a_{1,M-1}$ OR . . . OR $a_{m-1,M-1}$) is calculated.

step2: $[[e_{i,M-1}]]^Q=[[a_{i,M-1}\ \mathrm{XOR}\ a_{max,M-1}]]^Q$ is calculated for 0≤i<m.

step3: for j=M−2 to 0 do

Step3-1: For 0≤i<m, $[[b_{i,j}]]^Q=[[a_{i,j}\Lambda_{i,j+1}]]^Q$ is calculated.

Step3-2: A share $[[a_{maxi,j}]]^Q$ of $a_{max,j}$ which is OR of $b_{i,j}$ (0≤i<m) (provided that $a_{max,j}=b_{0,j}$ OR $b_{1,j}$ OR . . . OR $b_{m-1,j}$) is calculated.

Step3-3: For 0≤i<m, $[[e'_{i,j}]]^Q=[[e_{i,j+1}\Lambda\neg a_{max,j}]]^Q$ is calculated.

step3-4: For 0≤i<m, $[[e_{i,j}]]^Q=[[b_{i,j}\ \mathrm{XOR}\ e'_{i,j}]]^Q$ is calculated.

Step4: $a_{max}=a_{max,M-1}a_{max,M}\ldots a_{max,0}$ ($a_{max,M-1}a_{max,M}\ldots a_{max,0}$ is a bit representation to assume $a_{max,j}$ as the j-th digit from right side) is generated.

In the case of executing this protocol after executing the bit decomposition described above, Q=2 may be used.

[Uniforming Exponent Part of Floating Point Vector]

Input: a share $([[-a]]^P, [[-\rho]]^Q)$ of a floating point vector $(\vec{a}, \vec{\rho})$ (provided that $\vec{a}=(a_0, a_1, \ldots, a_{m-1})$, $-\rho=(\rho_0, \rho_1, \ldots, \rho_{m-1})$)

Output: a share $([[\vec{b}]]^P, [[\vec{\rho}_{max}]]^Q)$ of a floating point vector $(\vec{b}, \vec{\rho}_{max})$ obtained by uniforming exponent parts of the floating point vector $(\vec{a}, \vec{\rho})$ (provided that $\vec{b}=(b_0, b_1, \ldots, b_{m-1})$, $\vec{\rho}_{max}=(\rho_{max}, \rho_{max}, \ldots, \rho_{max})$ (provided that $\rho_{max}=\max\{\rho_0, \rho_1, \ldots \rho_{m-1}\}$, $|\vec{\rho}_{max}|=m$))

Here, $2^{\rho\_i}a_i\approx 2^{\rho\_max}b_i$ (0≤i<m) is satisfied.

Step1: By using maximum value calculation, $[[\rho_{max}]]Q$ is obtained from $[[\vec{\rho}]]^Q$.

Step2: $[[\vec{\rho}_{dif}]]^Q=[[\vec{\rho}]]^Q-[[\vec{\rho}_{max}]]^Q$ is calculated.

step3: A share $[[\vec{b}]]^P=([[b_0]]^P, [[b_1]]^P, \ldots, [[b_{m-1}]]^P)$ is calculated, with shift amount concealment shift (part 2) or shift amount concealment shift (part 3), by calculating a share $[[b_i]]^P$ (provided that $b_i=2^{-\rho\_dif,i}a_i$) of the number $b_i$ which is obtained by $-\rho_{dif,i}$ bit shift of the number $a_i$, from the i-th element $[[a_i]]^P$ of the share $[[\vec{a}]]^P$ and the i-th element $\langle\langle\rho_{dif,\,i}\rangle\rangle^{Q}$ of a share $\langle\langle\vec{\rho}_{dif}\rangle\rangle^{Q}$ converted by replicated secret sharing from the share $[[\vec{\rho}_{dif}]]^{Q}$.

step4: A share $([[\vec{b}]]^{P}, [[\vec{\rho}_{max}]]^{Q})$ is generated.

[Sum of Floating Point Vector]

Input: a share $([[\vec{a}]]^{P}, [[\vec{\rho}]]^{Q})$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$).

Parameter: vector length m.

Output: a share $([[b]]^{P}, [[\sigma]]^{Q})$ of a floating point $(b, \sigma)$ which is a sum of floating points which are elements of the floating point vector $(\vec{a}, \vec{p})$.

Here, $\Sigma_{0\le i<m}2^{\rho\_i}a_i\approx 2^{\sigma}b$ is satisfied.

step1: By using uniforming exponent part of floating point vector, a share $([[\vec{a}']]^{P}, [[\vec{\rho}_{max}]]^{Q})$ obtained by uniforming exponent parts of elements of the share $([[\vec{a}]]^{P}, [[\vec{\rho}]]^{Q})$ (provided that $\vec{a}'=(a'_0, a'_1, \ldots, a'_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i\approx 2^{\rho\_max}a'_i$ $(0\le i<m)$ is satisfied) is calculated.

Step2: A share $([[b]]^{P}, [[\sigma]]^{Q})$ (provided that $b=\Sigma_{0\le i<m}a'_i$, $\sigma=\rho_{max}$) is calculated.

[Product Sum of Floating Point Vector]

Input: a share $([[a]]^{P}, [[\vec{\rho}]]^{Q})$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), a share $([[\vec{b}]]^{P}, [[\vec{\sigma}]]^{Q})$ of a floating point vector $(\vec{b}, \vec{\sigma})$ (provided that $\vec{b}=(b_0, b_1, \ldots, b_{m-1})$, $\vec{\sigma}=(\sigma_0, \sigma_1, \ldots, \sigma_{m-1})$).

Parameter: vector length m

Output: a share $([[c]]^{P}, [[\tau]]^{Q})$ of a floating point $(c, \tau)$ which is a product sum of floating points which are elements of the floating point vector $(\vec{a}, \vec{\rho})$ and floating points which are elements of the floating point vector $(\vec{b}, \vec{\sigma})$ Here, $\Sigma_{0\le i<m}2^{\rho\_i+\sigma\_i}a_ib_i\approx 2^{\tau}c$ is satisfied.

Step1: By using uniforming exponent part of floating point vector, a share $([[\vec{a}']]^{P}, [[\vec{\rho}_{max}]]^{Q})$ obtained by uniforming exponent parts of elements of the share $([[\vec{a}]]^{P}, [[\vec{\rho}]]^{Q})$ (provided that $\vec{a}'=(a'_0, a'_1, \ldots, a'_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i\approx 2^{\rho\_max}a'_i$ $(0\le i<m)$ is satisfied), and a share $([[\vec{b}']]^{P}, [[\vec{\sigma}_{max}]]^{Q})$ obtained by uniforming exponent parts of elements of the share $([[\vec{b}]]^{P}, [[\vec{\sigma}]]^{Q})$ (provided that $\vec{b}'=(b'_0, b'_1, \ldots, b'_{m-1})$, $\vec{\sigma}_{max}=(\sigma_{max}, \sigma_{max}, \ldots, \sigma_{max})$ (provided that $\sigma_{max}=\max\{\sigma_0, \sigma_1, \ldots, \sigma_{m-1}\}$, $|\vec{\sigma}_{max}|=m$), $2^{\sigma\_i}b_i\approx 2^{\sigma\_max}b'_i$ $(0\le i<m)$ is satisfied) are calculated.

Step2: A share $([[c]]^{P}, [[\tau]]^{Q})$ (provided that $c=\Sigma_{0\le i<m}a'_ib'_i$, $\tau=\rho_{max}+\sigma_{max}$) is calculated.

First Embodiment

Figure 2:
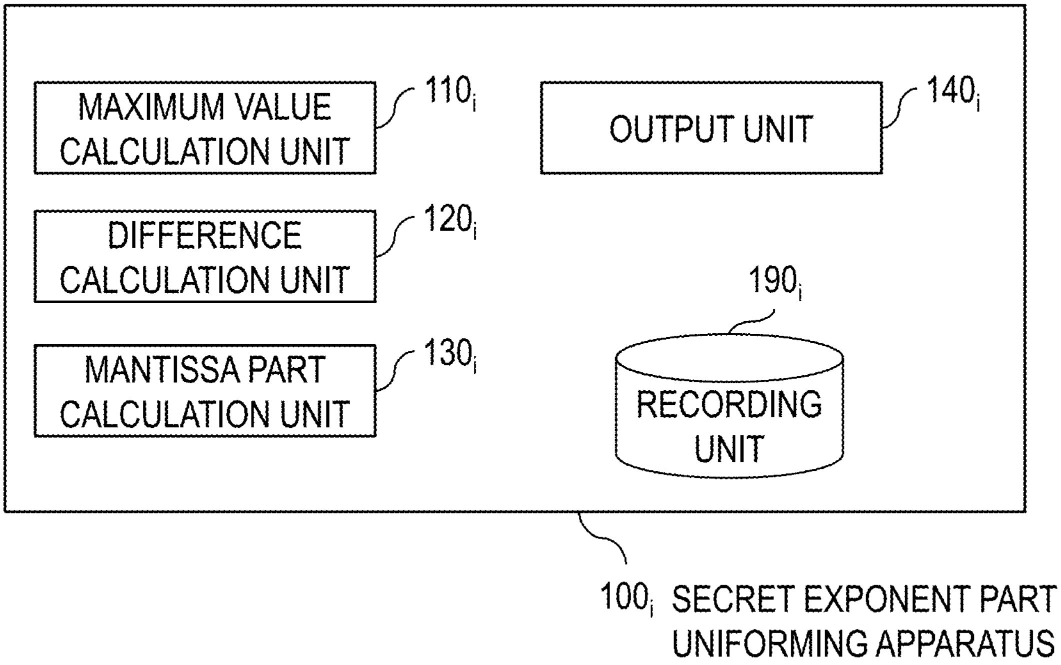
FIG. 2 is a block diagram illustrating a configuration of a secret exponent part uniforming apparatus 100.
Figure 3:
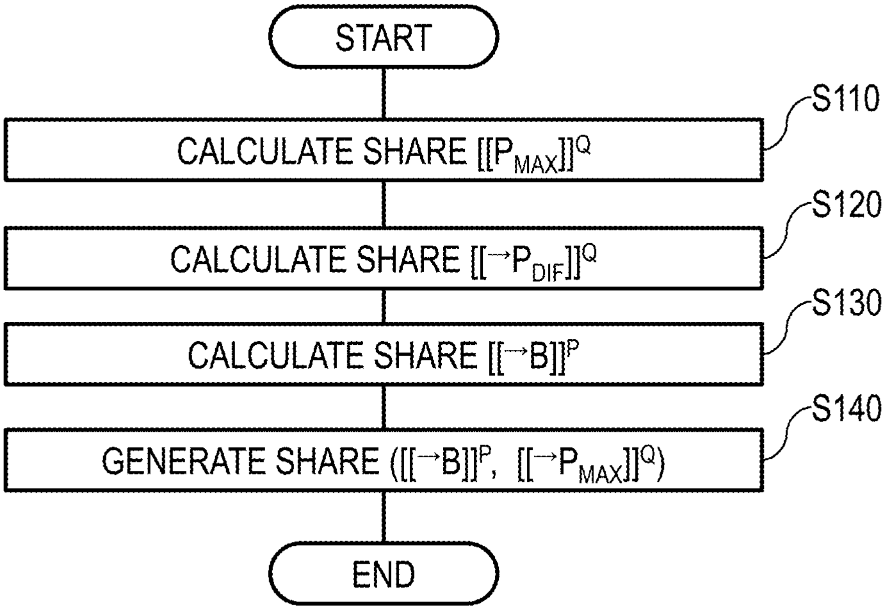
FIG. 3 is a flowchart illustrating an operation of the secret exponent part uniforming system 10.

In the following, the secret exponent part uniforming system 10 will be described below with reference to FIG. 1 to FIG. 3. FIG. 1 is a block diagram showing a configuration of the secret exponent part uniforming system 10. The secret exponent part uniforming system 10 includes W pieces of secret exponent part uniforming apparatuses $\mathbf{100}_1, \ldots, \mathbf{100}_W$ (W is a prescribed integer of 3 or more). The secret exponent part uniforming apparatuses $\mathbf{100}_1, \ldots, \mathbf{100}_W$ are connected to a network 800 and can communicate with each other. The network 800 may be, for example, a communication network such as the Internet or a broadcast communication path. FIG. 2 is a block diagram showing a configuration of the secret exponent part uniforming apparatus $\mathbf{100}_1$ $(1\le i\le W)$. FIG. 3 is a flowchart illustrating a operation of the secret exponent part uniforming system 10.

As shown in FIG. 2, the secret exponent part uniforming apparatus $\mathbf{100}_i$ includes a maximum value calculation unit $\mathbf{110}_i$, a difference calculation unit $\mathbf{120}_i$, a mantissa part calculation unit $\mathbf{130}_i$, an output unit $\mathbf{140}_i$ And a recording unit $\mathbf{190}_i$. Each component unit of the secret exponent part uniforming apparatus $\mathbf{100}_i$ excluding the recording unit $\mathbf{190}_i$ is configured to execute an operation required for secure computation, that is, an operation required for realizing the function of each component part among protocols explained in <Technical background>. A specific functional configuration for realizing individual operations in the present invention is sufficient to be a configuration capable of executing the algorithms disclosed in each of the reference non-patent documents 1 to 5, for example, and since these are a conventional configuration, detailed description thereof will be omitted. The recording unit $\mathbf{190}_i$ is a component for properly recording information necessary for the processing of the secret exponent part uniforming apparatus $\mathbf{100}_i$.

By cooperative calculation by W secret exponent part uniforming apparatuses $\mathbf{100}_i$, the secret exponent part uniforming system 10 realizes secure computation of exponent part uniforming of a floating point vector being a multi-party protocol. Therefore, a maximum value calculation means 110 (not shown) of the secret exponent part uniforming system 10 is constituted of the maximum value calculation units $\mathbf{110}_1, \ldots, \mathbf{110}_W$, a difference calculation means 120 (not shown) is constituted of the difference calculation units $\mathbf{120}_1, \ldots, \mathbf{120}_W$, a mantissa part calculating means 130 (not shown) is constituted of the mantissa part calculating units $\mathbf{130}_1, \ldots, \mathbf{130}_W$, and an output means 140 (not shown) is constituted of the output units $\mathbf{140}_1, \ldots, \mathbf{140}_W$.

It is assumed that P is a prime number and Q is an order of a residue ring, the secret exponent part uniforming system 10, from a share $([[\vec{a}]]^{P}, [[\vec{\rho}]]^{Q})$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), calculates a share $([[\vec{b}]]^{P}, [[\vec{\rho}_{max}]]^{Q})$ of a floating point vector $(\vec{b}, \vec{\rho}_{max})$ obtained by uniforming exponent parts of elements of the floating point vector $(\vec{a}, \vec{\rho})$, (provided that $\vec{b}=(b_0, b_1, \ldots, b_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i\approx 2^{\rho\_max}b_i$ $(0\le i<m)$ is satisfied). In the following the operation of the secret exponent part uniforming system 10 will be described with reference to FIG. 3.

In S110, the maximum value calculation means 110 calculates a share $[[\rho_{max}]]^{Q}$ from the share $[[\vec{\rho}]]^{Q}$. The maximum value calculation means 110 may be configured to execute, for example, maximum value calculation.

In S120, the difference calculation means 120 calculates a share $[[\vec{\rho}_{dif}]]^{Q}=[[\vec{\rho}]]^{Q}-[[\vec{\rho}_{max}]]^{Q}$ from the share $[[\vec{\rho}]]^{Q}$ and the share $[[\rho_{max}]]^{Q}$ calculated in S110.

In S130, the mantissa part calculation means 130 calculates a share $[[\vec{b}]]^{P}=([[b_0]], [[b_1]]^{P}, \ldots, [[b_{m-1}]]^{P})$ from the share $[[\vec{a}]]^{P}$ and the share $[[\vec{\rho}_{dif}]]^{Q}$, for i which is satisfied $0\le i<m$, by calculating a share $[[b_i]]^{P}$ (provided that $b_i=2^{-p\_dif,\,i}a_i$) of the number $b_i$ which is obtained by $-\rho_{dif,\,i}$ bit shift of the number $a_i$, from the i-th element $[[a_i]]_P$ of the share $[[\vec{a}]]^{P}$ and the i-th element $\langle\langle\rho_{dif,\,i}\rangle\rangle^{Q}$ of a share $\langle\langle-\rho_{dif}\rangle\rangle^{Q}$ converted by replicated secret sharing from the share $[[\vec{\rho}_{dif}]]^{Q}$. The mantissa part calculating means 130 may be configured to execute, for example, shift amount concealment shift (part 2) or shift amount concealment shift (part 3).

In S140, the output unit 140 generates the share $([[\vec{b}]]^{P}, [[\vec{\rho}_{max}]]^{Q})$ from the share $[[\vec{b}]]^{P}$ calculated in S130 and the share $[[\rho_{max}]]^{Q}$ calculated in S110.

According to an embodiment of the present invention, it is possible to efficiently uniform the exponent part of the floating point while keeping confidentiality.

Second Embodiment

Figure 4:
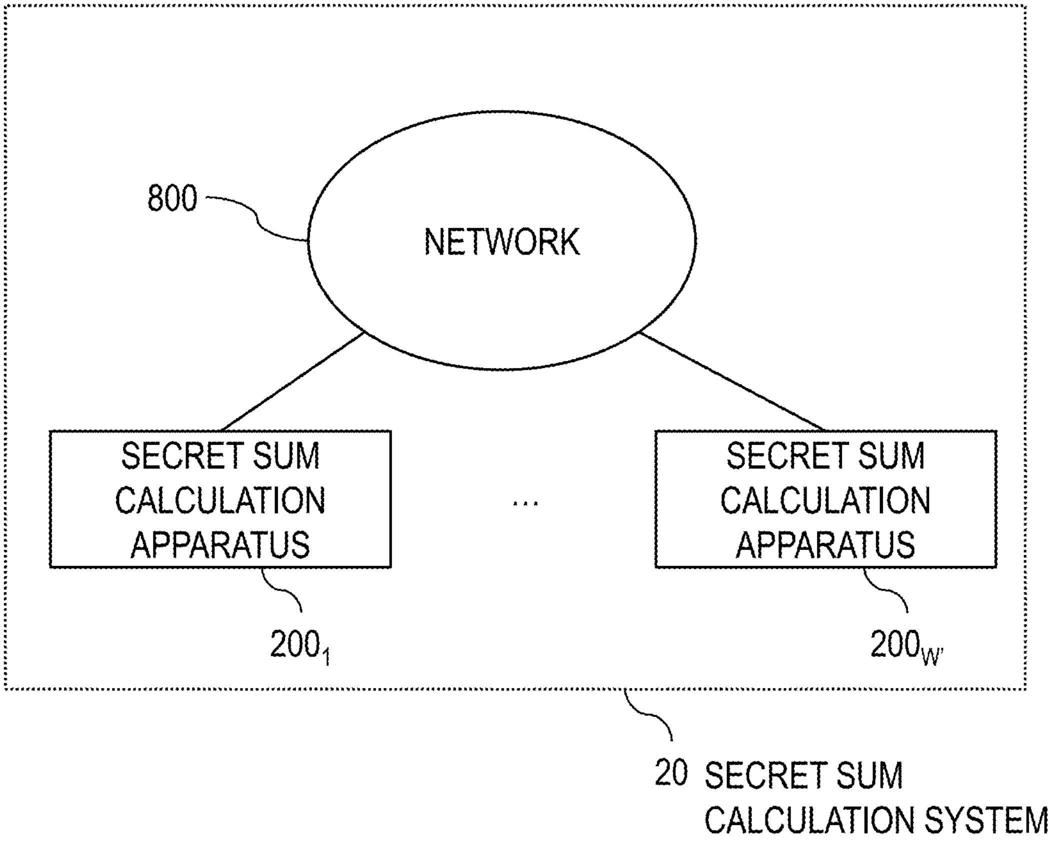
FIG. 4 is a block diagram illustrating a configuration of a configuration of a secret sum calculation system 20.
Figure 5:
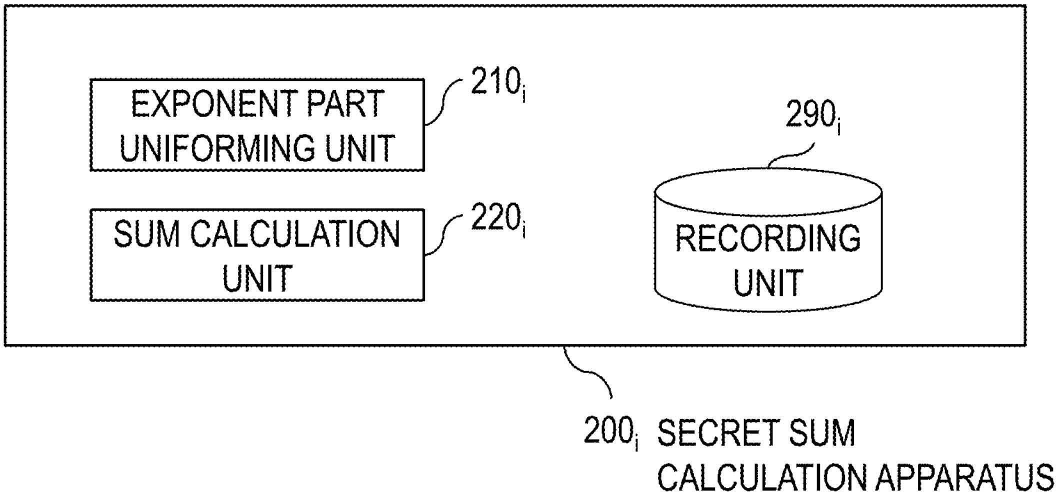
FIG. 5 is a block diagram illustrating a configuration of a secret sum calculation apparatus 200.
Figure 6:
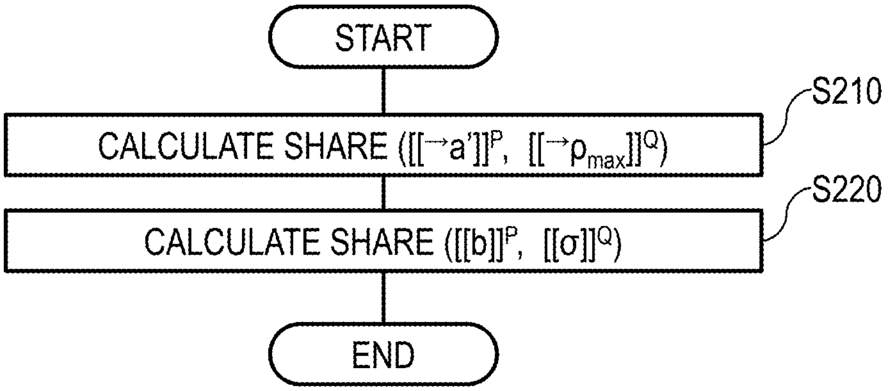
FIG. 6 is a flowchart illustrating an operation of the secret sum calculation system 20.

In the following, the secret sum calculation system 20 will be described with reference to FIG. 4 to FIG. 6. FIG. 4 is a block diagram showing a configuration of the secret sum calculation system 20. The secret sum calculation system 20 includes W pieces of secret sum calculation apparatuses $\mathbf{200}_1, \ldots, \mathbf{200}_W$ (W is a prescribed integer of 3 to or more). The secret sum calculation apparatuses $\mathbf{200}_1, \ldots, \mathbf{200}_W$ are connected to a network 800 and can communicate with each other. The network 800 may be, for example, a communication network such as the Internet or a broadcast communication path. FIG. 5 is a block diagram illustrating a configuration of the secret sum calculation apparatus $\mathbf{200}_i$ ($1 \le i \le W$). FIG. 6 is a flowchart illustrating an operation of the secret sum calculation system 20.

As shown in FIG. 5, the secret sum calculation apparatus $\mathbf{200}_i$ includes an exponent part uniforming unit $\mathbf{210}_i$, a sum calculation part $\mathbf{220}_i$, and a recording part $\mathbf{290}_i$. Each constituent unit of the secret sum calculation apparatus $\mathbf{200}_i$ excluding the recording part $\mathbf{290}_i$ is configured to execute an operation required for secure computation, that is, an operation required for realizing the function of each component part among protocols explained in <Technical background>. A specific functional configuration for realizing individual operations in the present invention is sufficient to be a configuration capable of executing the algorithms disclosed in each of the reference non-patent documents 1 to 5, for example, and since these are a conventional configuration, detailed description thereof will be omitted. The recording unit $\mathbf{290}_i$ is a component for properly recording information necessary for the processing of the secret sum calculation apparatus $\mathbf{200}_i$.

By cooperative calculation by W secret sum calculation apparatuses $\mathbf{200}_i$, the secret sum calculation system 20 realizes secure computation of sum of a floating point vector being a multi-party protocol. Therefore, a exponent part uniforming means 210 (not shown) of the secret sum calculation system 20 is constituted of the exponent part uniforming units $\mathbf{210}_i, \ldots, \mathbf{210}_W$, and a sum calculation means 220 (not shown) is constituted of the sum calculation units $\mathbf{220}_i, \ldots, \mathbf{220}_W$.

It is assumed that P is a prime number and Q is an order of a residue ring, and the secret sum calculation system 20, from a share $([[\vec{a}]]^P, [[\vec{\rho}]]^Q)$ of a floating point vector $(\vec{a}, \vec{\varphi}$ (provided that $\vec{a}=(a_0, a_1, \ldots, a_{m-1})$, $\vec{\rho}=(\rho_0, \rho_1, \ldots, \rho_{m-1})$), calculates a share $([[b]]^P, [[\sigma]]^Q)$ of a floating point vector $(b, \sigma)$ which is the sum of floating points which are elements of the floating point vector $(\vec{a}, \vec{\rho})$ (provided that $\Sigma_{0 \le i<m} 2^{\rho_i} a_i \approx 2^{\sigma} b$ is satisfied). In the following, the operation of the secret sum calculation system 20 will be described with reference to FIG. 6.

In S210, the exponent part uniforming means 210, from a share $([[\vec{a}]]^P, [[\vec{\rho}]]^Q)$, calculates a share $([[\vec{a}']]^P, [[\vec{\rho}_{max}]]^Q)$ of a floating point vector $(\vec{a}', \vec{\rho}_{max})$ obtained by uniforming exponent parts of the floating point vector $(\vec{a}, \vec{\rho})$ (provided that $\vec{a}'=(a'_0, a'_1, \ldots, a'_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho_i} a_i \neq 2^{\rho_{max}} a'_i$ ($0 \le i<m$) is satisfied). It is sufficient that the exponent part uniforming means 210, for example, is constituted of each means included in the secret exponent part uniforming system 10 (that is, a maximum value calculation means 110, a difference calculation means 120, a mantissa part calculation means 130, and an output means 140). In this case, the exponent part uniforming unit $\mathbf{210}_i$ of the secret sum calculation apparatus $\mathbf{200}_i$ is configured to include a maximum value calculation unit $\mathbf{110}_i$, a difference calculation unit $\mathbf{120}_i$, a mantissa part calculation unit $\mathbf{130}_i$, and an output unit $\mathbf{140}_i$.

In S220, the sum calculation means 220 calculates the shares $([[b]]^P, [[\sigma]]^Q)$ from the shares $([[\vec{a}']]^P, [[\vec{\rho}_{max}]]^Q)$ calculated in S210 (provided that $b=\Sigma_{0 \le i<m} a'_i$, $\sigma=\rho_{max}$).

According to an embodiment of the present invention, the sum of floating points can be calculated efficiently by using secure computation for uniforming the exponent parts of floating points efficiently.

Third Embodiment

Figure 7:
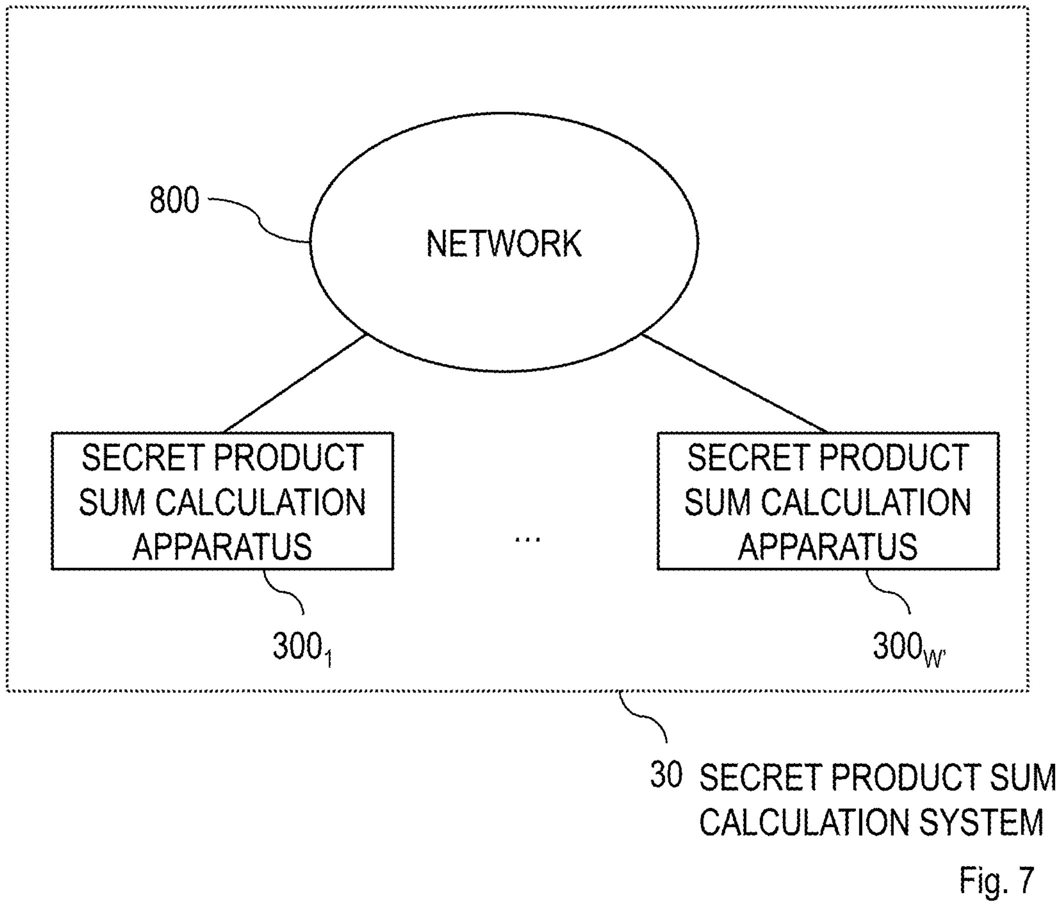
FIG. 7 is a block diagram illustrating a configuration of a secret product sum calculation system 30.
Figure 8:
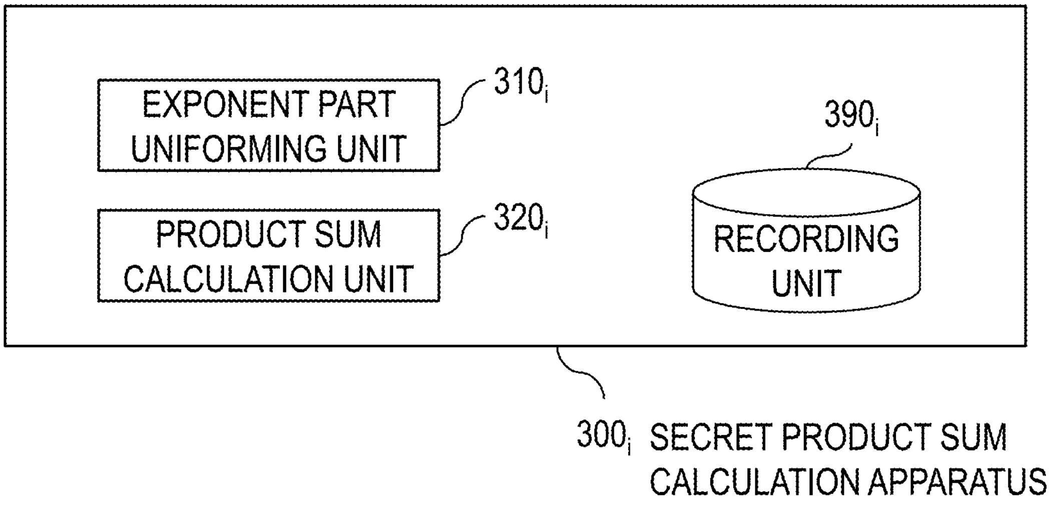
FIG. 8 is a block diagram illustrating a secret product sum calculation apparatus 300.
Figure 9:
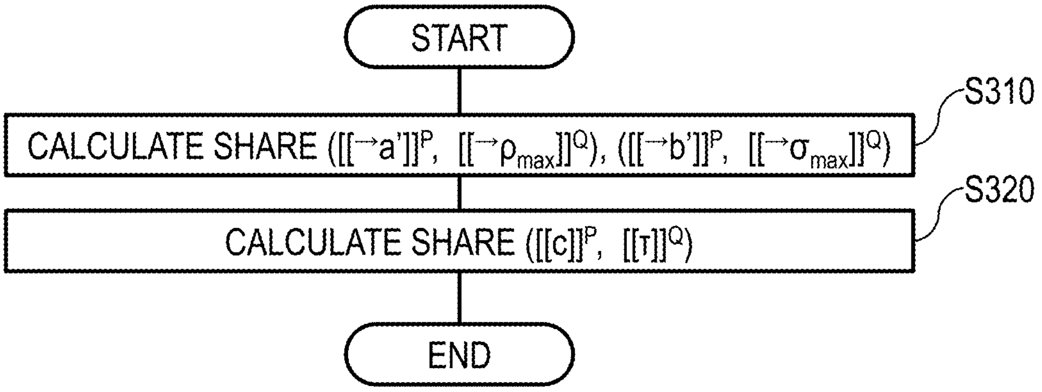
FIG. 9 is a flowchart illustrating an operation of the secret product sum calculation system 30.

In the following, the secret product sum calculation system 30 will be described below with reference to FIG. 7 to FIG. 9. FIG. 7 is a block diagram showing a configuration of the secret product sum calculation system 30. The secret product sum calculation system 30 includes W pieces of secret product sum calculation apparatuses $\mathbf{300}_1, \ldots, \mathbf{300}_W$ (W is a prescribed integer of 3 or more). The secret product sum calculation apparatuses $\mathbf{300}_1, \ldots, \mathbf{300}_W$ are connected to a network 800 and can communicate with each other. The network 800 may be, for example, a communication network such as the Internet or a broadcast communication path. FIG. 8 is a block diagram illustrating a configuration of the secret product sum calculation apparatuses $\mathbf{300}_i$. FIG. 9 is a flowchart illustrating an operation of the secret product sum calculation system 30.

As shown in FIG. 8, the secret product sum calculation apparatus $\mathbf{300}_i$ includes an exponent part uniforming unit $\mathbf{310}_i$, a product sum calculation unit $\mathbf{320}_i$, and a recording unit $\mathbf{390}_i$. Each constituent part of the secret product sum calculation apparatus $\mathbf{300}_i$ excluding the recording part $\mathbf{390}_i$ is configured to execute an operation required for secure computation, that is, an operation required for realizing the function of each component part among protocols explained in <Technical background>. A specific functional configuration for realizing individual operations in the present invention is sufficient to be a configuration capable of executing the algorithms disclosed in each of the reference non-patent documents 1 to 5, for example, and since these are a conventional configuration, detailed description thereof will be omitted. The recording unit 390*i* is a component for properly recording information necessary for the processing of the secret product sum calculation apparatus 300*i*.

By cooperative calculation by W secret product sum calculation apparatuses $\mathbf{300}_i$, the secret product sum calculation system 30 realizes secure computation of product sum of floating point vectors being a multi-party protocol. Therefore, an exponent part uniforming means 310 (not shown) of the secret product sum calculation system 30 is constituted of the exponent part uniforming units $\mathbf{310}_i, \ldots, \mathbf{310}_W$, and a product sum calculation means 320 (not shown) is constituted of the product sum calculation units $\mathbf{320}_i \ldots, \mathbf{320}_W$.

It is assumed that P is a prime number and Q is an order of a residue ring, the secret product sum calculation system 30, from a share $([[\vec{a}]]^P, [[\vec{\rho}]]^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$) and a share $([[\vec{b}]]^P, [[\vec{\sigma}]]^Q)$ (provided that $\vec{b}=(b_0, b_1, \ldots, b_{m-1})$, $\vec{\sigma}=(\sigma_0, \sigma_1, \ldots, \sigma_{m-1})$), calculates a share $([[c]]^P, [[\tau]]^Q)$ of a floating point vector $(c, \tau)$ which is the product sum of floating points which are elements of the floating point vector $(\vec{a}, \vec{\rho})$ and floating points which are elements of the floating point vector $(\vec{b}, \vec{\sigma})$ (provided that $\Sigma_{0 \le i<m} 2^{\rho_i+\sigma_i} a_i b_i \approx 2^{\tau} c$ is satisfied).

In the following, the operation of the secret product sum calculation system 30 will be described with reference to FIG. 9.

In S310, the exponent part uniforming means 310, from the share ($[[\vec{a}]]^P$, $[[\vec{p}]]^Q$) and the share ($[[\vec{b}]]^P$, $[[\vec{\sigma}]]^Q$), calculates a share ($[[\vec{a}']]^P$, $[[\vec{\rho}_{max}]]^Q$) of a floating point vector ($\vec{a}'$, $\vec{\rho}_{max}$) obtained by uniforming exponent parts of the floating point vector ($\vec{a}$, $\vec{\rho}$) (provided that $\vec{a}'=(a'_0, a'_1, \ldots, a'_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i \approx 2^{\rho\_max} a'_i$ $(0 \le i < m)$ is satisfied), and a share ($[[\vec{b}']]^P$, $[[\vec{\sigma}_{max}]]^Q$) of a floating point vector ($\vec{b}'$, $\vec{\sigma}_{max}$) obtained by uniforming exponent parts of the floating point vector ($\vec{b}$, $\vec{\sigma}$) (provided that $\vec{b}'=(b'_0, b'_1, \ldots, b'_{m-1})$, $\vec{\sigma}_{max}=(\sigma_{max}, \sigma_{max}, \ldots, \sigma_{max})$ (provided that $\sigma_{max}=\max\{\sigma_0, \sigma_1, \ldots, \sigma_{m-1}\}$, $|\vec{\sigma}_{max}|=m$), $2^{\sigma\_i}b_i \approx 2^{\sigma\_max}b'_i$ $(0 \le i < m)$ is satisfied). It is sufficient that the exponent part uniforming means 310, for example, is constituted of each means included in the secret exponent part uniforming system 10 (that is, a maximum value calculation means 110, a difference calculation means 120, a mantissa part calculation means 130, and an output means 140). In this case, the exponent part uniforming unit $\mathbf{310}_i$ of the secret product sum calculation apparatus $\mathbf{300}_i$ is configured to include a maximum value calculation unit $\mathbf{110}_i$, a difference calculation unit $\mathbf{120}_i$, a mantissa part calculation unit $\mathbf{130}_i$, and an output unit $\mathbf{140}_i$.

In S320, the product sum calculation unit 320, from the share ($[[\vec{a}']]^P$, $[[\vec{\rho}_{max}]]^Q$) calculated in S310 and the share ($[[\vec{b}']]^P$, $[[\vec{\sigma}_{max}]]^Q$) calculated in S310, calculates the share ($[[c]]^P$, $[[\tau]]^Q$) (provided that $c=\Sigma_{0 \le i < m} a'_i b'_i$, $\tau=\rho_{max}+\sigma_{max}$).

According to an embodiment of the present invention, the product sum of the floating points can be calculated efficiently by using secure computation for uniforming the exponent parts of the floating points efficiently.

Supplementary Note

Figure 10:
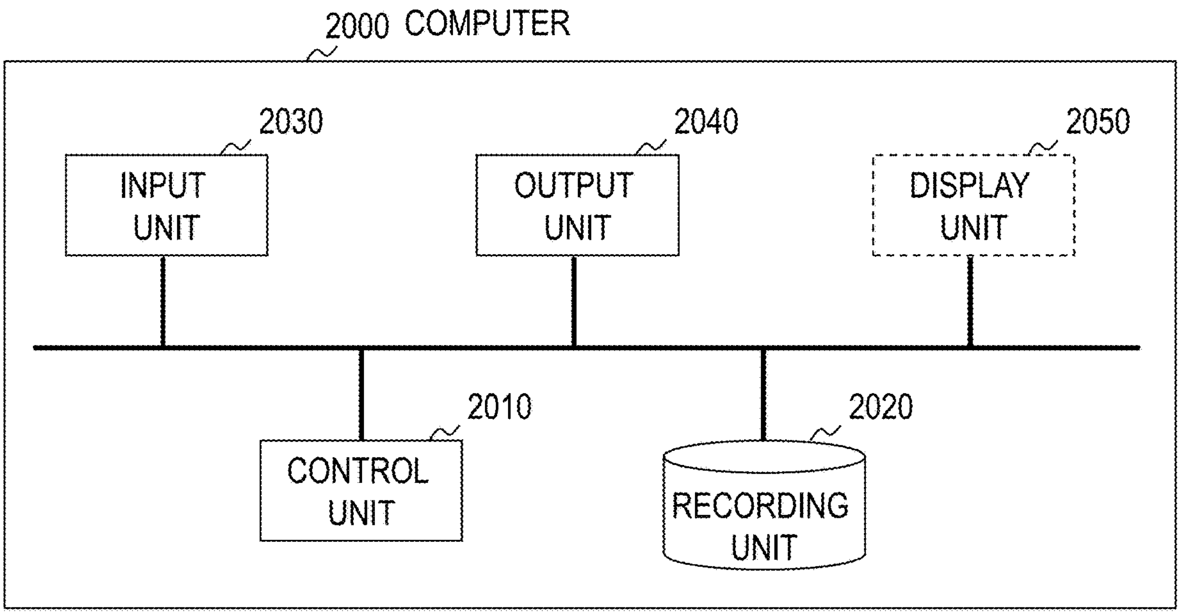
FIG. 10 is a diagram showing an example of a functional configuration of a computer that realizes each apparatus according to the embodiment of the present invention.

FIG. 10 is a diagram showing an example of a functional configuration of a computer that realizes each apparatus described above. Processing performed in each apparatus described above can be implemented by causing a recording unit 2020 to read a program for causing the computer to function as each apparatus described above, and causing a control unit 2010, an input unit 2030, an output unit 2040, and the like to operate.

The apparatuses of the present invention includes, for example, as a single hardware entity, an input unit to which a keyboard or the like can be connected, an output unit to which a liquid crystal display or the like can be connected, a communication unit to which a communication apparatus (e.g., a communication cable) capable of communicating with the exterior of the hardware entity can be connected, a CPU (Central Processing Unit; may also include a cache memory, registers, etc.), a RAM or ROM serving as a memory, an external storage device, which is a hard disk, and a bus that connects the input unit, the output unit, the communication unit, the CPU, the RAM, the ROM, and the external storage device such that data can be exchanged there between. As needed, for hardware entity, an device (drive) which can read and write from or to a recording medium such as CD-ROM may be provided. A general-purpose computer or the like is an example of a physical entity including such hardware resources.

A program that is necessary to realize the above-described functions and data and the like that are necessary for processing of the program are stored in the external storage device of the hardware entity (the program does not necessarily have to be stored in the external storage device, and may be stored in, for example, the ROM, which is a read-only storage device). Data and the like that are obtained in the processing of the program are stored in the RAM, the external storage device or the like as appropriate.

In the hardware entity, each program stored in the external storage device (or ROM, etc.) and the data needed for processing of each program are loaded to the memory as needed, and the CPU interprets, executes, and processes them as appropriate. As a result, a CPU realizes a predetermined function (each constitution department that above, . . . unit, . . . means referred to).

The present invention is not limited to the embodiments described above, and can be modified appropriately within a scope not departing from the gist of the present invention. The processing steps described in the foregoing embodiments do not necessarily have to be executed chronologically in the described order, and may be executed in parallel or individually as necessary or according to the processing capacity of the apparatus that executes the processing.

As described above, in a case where processing functions of the hardware entity (the apparatus according to the present invention) described in the foregoing embodiments are realized by a computer, the processing contents of the functions that are to be included in the hardware entity are described by a program. The processing functions of the hardware entity described above are realized in the computer as a result of the program being executed by the computer.

The program that described this processing contents can be stored in the recording medium which is readable with a computer. For example, anything such as a magnetic recording device, an optical disk, a magneto-optical recording medium, semiconductor memory is enough for a readable recording medium with a computer. Specifically, for example, a hard disk device, a flexible disk, a magnetic tape, or the like can be used as a magnetic recording device, and a DVD (Digital Versatile Disc), a DVD-RAM (Random Access Memory), a CD-ROM (Compact Disc Read Only Memory), CD-R (Recordable)/RW (Rewritable), or the like can be used as an optical disk, an MO (Magneto-Optical disc) or the like can be used as magneto-optical recording medium, and an EEP-ROM (Electronically Erasable and Programmable-Read Only Memory) or the like can be used as a semiconductor memory.

In addition, the distribution of this program is carried out by, for example, selling, transferring, or lending a portable recording medium such as a DVD or a CD-ROM on which the program is recorded. Further, the program may be distributed by storing the program in a storage device of a server computer and transmitting the program from the server computer to other computers via a network.

A computer executing such a program is configured to, for example, first, temporarily store a program recorded on a portable recording medium or a program transferred from a server computer in its own storage device. When executing the processing, the computer reads the program stored in its own storage device, and executes the processing according to the read program. As another execution form of the program, the computer may directly read the program from the portable recording medium and execute processing according to the program, or each time a program is transferred from the server computer to the computer, processing according to the received program may be executed sequentially. In addition, by a so-called ASP (Application Service Provider) type service which does not transfer a program from the server computer to the computer and realizes a processing function only by the execution instruction and the result acquisition, the above-mentioned processing may be executed. It is assumed that the program in this embodiment includes data which is information to be provided for processing by the electronic computer and which is not a direct command to the computer conforming to the program but has a property to specify the processing of the computer.

According to this aspect, the computer is caused to execute a predetermined program to constitute the hardware entity, but at least part of the processing contents may be realized using hardware.

The above descriptions of the embodiments of the present invention are presented for the purpose of illustration and description. The descriptions are neither intended to be comprehensive nor to limit the present invention to the strict form disclosed. Modifications and variations can be made from the teachings described above. The embodiments were selected and described to provide the best illustration of the principle of the present invention such that those skilled in the art can use the present invention in various embodiments suitable for thoroughly considered practical use, and by adding various alterations. All of such modifications and variations are within the scope of the present invention defined by the appended claims that are interpreted according to a fairly, legally, and equitably given range.

The invention claimed is:

1. A secret exponent part uniforming system where P is a prime number and Q is an order of a residue ring, the secret exponent part uniforming system which is comprised of three or more secret exponent part uniforming apparatuses connected via a communication network in a multi-party protocol, and each calculates, from a share $(((\vec{a}))^P, ((\vec{\rho}))^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), a share $(((\vec{b}))^P, ((\vec{\rho}_{max}))^Q)$ of a floating point vector $(\vec{b}, \vec{\rho}_{max})$ obtained by uniforming exponent parts of the floating point vector $(\vec{a}, \vec{\rho})$ (provided that $\vec{b}=(b_0, b_1, \ldots, b_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i \approx 2^{\rho\_max}b_i$ $(0 \le i<m)$ is satisfied), the secret exponent part uniforming system comprising:

- maximum value calculation circuitry configured to calculate a share $((\rho_{max}))^Q$ from the share $((\vec{\rho}))^Q$;
- difference calculation circuitry configured to calculate a share $((\vec{\rho}_{dif}))^Q=((\vec{\rho}))^Q-((\vec{\rho}_{max}))^Q$ from the share $((\vec{\rho}))^Q$ and the share $((\rho_{max}))^Q$;
- mantissa part calculation circuitry configured to calculate a share $((\vec{b}))^P=(((b_0))^P, ((b_1))^P, \ldots, ((b_{m-1}))^P)$ from the share $((\vec{a}))^P$ and the share $((\vec{\rho}_{dif}))^Q$, for i which is satisfied $0 \le i<m$, by calculating a share $((b_i))^P$ (provided that $b_i=2^{-\rho\_dif,i}a_i$) of the number $b_i$ which is obtained by $-\rho_{dif,i}$ bit shift of the number $a_i$, from the i-th element $((a_i))^P$ of the share $((\vec{a}))^P$ and the i-th element $<<\rho_{dif,i}>>^Q$ of a share $<<\vec{\rho}_{dif}>>^Q$ converted by replicated secret sharing from the share $((\vec{\rho}_{dif}))^Q$; and
- output circuitry configured to generate the share $(((\vec{b}))^P, ((\vec{\rho}_{max}))^Q)$ from the share $((\vec{b}))^P$ and the share $((\vec{\rho}_{max}))^Q$, wherein
- each secret exponent part uniforming apparatus transmits their respective resultant share with each other to restore information related to the resultant share.

2. A secret sum calculation system where P is a prime number and Q is an order of a residue ring, the secret sum calculation system which is comprised of three or more secret exponent uniforming apparatuses connected via a communication network in a multi-party protocol, and each calculates, from a share $(((\vec{a}))^P, ((\vec{\rho}))^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), a share $(((b))^P, ((\sigma))^Q)$ of a floating point $(b, \sigma)$ which is sum of floating points which are elements of the floating point vector $(\vec{a}, \vec{\rho})$ (provided that $\Sigma_{0 \le i<m}2^{\rho\_i}a_i \approx 2^{\sigma}b$ is satisfied), the secret sum calculation system comprising:

- exponent part uniforming circuitry configured to calculate, from the share $(((\vec{a}))^P, ((\vec{\rho}))^Q)$, a share $(((\vec{a}'))^P, ((\vec{\rho}_{max}))^Q)$ of a floating point vector $(\vec{a}', \vec{\rho}_{max})$ that is obtained by uniforming exponent parts of the floating point vector $(\vec{a}, \vec{\rho})$ (provided that $\vec{a}'=(a'_0, a'_1, \ldots, a'_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), and $2^{\rho\_i}a_i \approx 2^{\rho\_max}a'_i$ $(0 \le i<m)$ is satisfied);
- sum calculation circuitry configured to calculate the share $(((b))^P, ((\sigma))^Q)$ from the share $(((\vec{a}'))^P, ((\vec{\rho}_{max}))^Q)$, (provided that $b=\Sigma_{0 \le i<m}a'_i$, $\sigma=\rho_{max}$); and
- the exponent part uniforming circuitry is configured by using each circuitry included in the secret exponent part uniforming system according to claim 1.

3. A secret product sum calculation system where P is a prime number and Q is an order of a residue ring, the secret product sum calculation system which is comprised of three or more secret product sum calculation apparatuses connected via a communication network in a multi-party protocol, and each calculates, from a share $(((\vec{a}))^P, ((\vec{\rho}))^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$) and a share $(((\vec{b}))^P, ((\vec{\sigma}))^Q)$ of a floating point vector $(\vec{b}, \vec{\sigma})$ (provided that $\vec{b}=(b_0, b_1, \ldots, b_{m-1})$, $\vec{\sigma}=(\sigma_0, \sigma_1, \ldots, \sigma_{m-1})$), a share $(((c))^P, ((\tau))^Q)$ of a floating point $(c, \tau)$ which is a product sum of floating points of elements of the floating point vector $(\vec{a}, \vec{\rho})$ and floating points of elements of the floating point vector $(\vec{b}, \vec{\sigma})$ (provided that $\Sigma_{0 \le i<m} 2^{\rho\_i+\sigma\_i}a_ib_i \approx 2^{\tau}c$ is satisfied), the secret product sum calculation system comprising:

- exponent part uniforming circuitry which, from the share $(((\vec{a}))^P, ((\vec{\rho}))^Q)$ and the share $(((\vec{b}))^P, ((\vec{\sigma}))^Q)$, calculates a share $(((\vec{a}'))^P, ((\vec{\rho}_{max}))^Q)$ of a floating point vector $(\vec{a}', \vec{\rho}_{max})$ which is obtained by uniforming exponent parts of the floating point vector $(\vec{a}, \vec{\rho})$ (provided that $\vec{a}'=(a'_0, a'_1, \ldots, a'_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$) and $2^{\rho\_i}a_i \approx 2^{\rho\_max}a'_i (0 \le i<m)$ is satisfied) and a share $(((\vec{b}'))^P, ((\vec{\sigma}_{max}))^Q)$ of a floating point vector $(\vec{b}', \vec{\sigma}_{max})$ which is obtained by uniforming exponent parts of the floating point vector $(\vec{b}, \vec{\sigma})$ (provided that $\vec{b}'=(b'_0, b'_1, \ldots, b'_{m-1})$, $\vec{\sigma}_{max}=(\sigma_{max}, \sigma_{max}, \ldots, \sigma_{max})$ (provided that $\sigma_{max}=\max\{\sigma_0, \sigma_1, \ldots, \sigma_{m-1}\}$, $|\vec{\sigma}_{max}|=m$) and $2^{\sigma\_i}b_i \approx 2^{\sigma\_max}b'_i$ $(0 \le i<m)$ is satisfied);
- product sum calculation configured to calculate the share $(((c))^P, ((\tau))^Q)$ from the share $(((\vec{a}'))^P, ((\vec{\rho}_{max}))^Q)$ and the share $(((\vec{b}'))^P, ((\vec{\sigma}_{max}))^Q)$ (provided that $c=\Sigma_{0 \le i<m}a'_ib'_i$, $\tau=\rho_{max}+\sigma_{max}$); and
- the exponent part uniforming circuitry is configured by using each circuitry included in the secret exponent part uniforming system according to claim 1.

4. A secret exponent part uniforming apparatus in a secret exponent part uniforming system where P is a prime number and Q is an order of a residue ring, the secret exponent part uniforming system which is comprised of three or more secret exponent uniforming apparatuses connected via a communication network in a multi-party protocol, and each calculates, from a share $(((\vec{a}))^P, ((\vec{\rho}))^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), a share $(((\vec{b}))^P, ((\vec{\rho}_{max}))^Q)$ of a floating point vector $(\vec{b}, \vec{\rho}_{max})$ which is obtained by uniforming exponent parts of the floating point vector $(\vec{a}, \vec{\rho})$ (provided that $\vec{b}=(b_0, b_1, \ldots, b_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i \approx 2^{\rho\_max}b_i$ $(0 \le i < m)$ is satisfied), the secret exponent part uniforming apparatus comprising:

- a maximum value calculation circuitry which calculates a share $((\rho_{max}))^Q$ from the share $((\vec{\rho}))^Q$;
- a difference calculation circuitry which calculates a share $((\vec{\rho}_{dif}))^Q=((\vec{\rho}))^Q-((\vec{\rho}_{max}))^Q$ from the share $((\vec{\rho}))^Q$ and the share;
- a mantissa part calculation circuitry which calculates a share $((\vec{b}))^P=(((b_0))^P, ((b_1))^P, \ldots, ((b_{m-1}))^P)$ from the share $((\vec{a}))^P$ and the share $((\vec{\rho}_{dif}))^Q$, for i which is satisfied $0 \le i < m$, by calculating a share $((b_i))^P$ (provided that $b_i=2^{-P\_dif,i}a_i$) of the number $b_i$ which is obtained by $-\rho_{dif,i}$ bit shift of the number $a_i$, from the i-th element $((a_i))^P$ of the share $((\vec{a})^P$ and the i-th element $\langle\langle\rho_{dif,i}\rangle\rangle^Q$ of a share $\langle\langle\rho_{dif}\rangle\rangle^Q$ converted by replicated secret sharing from the share $((\vec{\rho}_{dif}))^Q$; and
- an output circuitry which generates the share $(((\vec{b}))^P, ((\vec{\rho}_{max}))^Q)$ from the share $((\vec{b}))^P$ and the share $((\vec{\rho}_{max}))^Q$, wherein
- each secret exponent part uniforming apparatus transmits their respective resultant share with each other to restore information related to the resultant share.

5. A non-transitory computer-readable recording medium storing a program for causing a computer to function as the secret exponent part uniforming apparatus according to claim 4.

6. A secret exponent part uniforming method where P is a prime number and Q is an order of a residue ring, the secret exponent part uniforming method by which, from a share $(((\vec{a}))^P, ((\vec{\rho}))^Q)$ of a floating point vector $(\vec{a}, \vec{\rho})$ (provided that $\vec{a}=(a_0, a_1, \ldots, a_{m-1})$, $\vec{\rho}=(\rho_0, \rho_1, \ldots, \rho_{m-1})$), a share $(((\vec{b}))^P, ((\vec{\rho}_{max}))^Q)$ of a floating point vector $(\vec{b}, \vec{\rho}_{max})$ which is obtained by uniforming exponent parts of the floating point vector $(\vec{a}, \vec{\rho})$ (provided that $\vec{b}=(b_0, b_1, \ldots, b_{m-1})$, $\vec{\rho}_{max}=(\rho_{max}, \rho_{max}, \ldots, \rho_{max})$ (provided that $\rho_{max}=\max\{\rho_0, \rho_1, \ldots, \rho_{m-1}\}$, $|\vec{\rho}_{max}|=m$), $2^{\rho\_i}a_i \approx 2^{\rho\_max}b_i$ $(0 \le i < m)$ is satisfied) is calculated by using a secret exponent part uniforming system comprised of three or more secret exponent uniforming apparatuses connected via a communication network in a multi-party protocol, the secret exponent part uniforming method comprising:

- a maximum value calculation step in which the secret exponent part uniforming system calculates a share $((\rho_{max}))^Q$ from the share $((\vec{\rho}))^Q$;
- a difference calculation step in which the secret exponent part uniforming system calculates a share $((\vec{\rho}_{dif}))^Q= ((\vec{\rho}))^Q-((\vec{\rho}_{max}))_Q$ from the share $((\vec{\rho}))^Q$ and the share $((\rho_{max}))^Q$;
- a mantissa part calculation step in which the secret exponent part uniforming system calculates a share $((\vec{b}))^P=(((b_0))^P, ((b_1))^P, \ldots, ((b_{m-1}))^P)$ from the share $((\vec{a}))^P$ and the share $((\vec{\rho}_{dif}))^Q$, for i which is satisfied $0 \le i < m$, by calculating a share $((b_i))^P$ (provided that $b_i=2^{-\rho\_dif,i}a_i$) of the number $b_i$ which is obtained by $-\rho_{dif,i}$ bit shift of the number $a_i$, from the i-th element $((a_i))^P$ of the share $((\vec{a}))^P$ and the i-th element $\langle\langle\rho_{dif,i}\rangle\rangle^Q$ of a share $\langle\langle\rho_{dif}\rangle\rangle^Q$ converted by replicated secret sharing from the share $((\vec{\rho}_{dif}))^Q$; and
- an output step in which the secret exponent part uniforming system generates the share $(((\vec{b}))^P, ((\vec{\rho}_{max}))^Q)$ from the share $((\vec{b}))^P$ and the share $((\vec{\rho}_{max}))^Q$, wherein
- each secret exponent part uniforming apparatus transmits their respective resultant share with each other to restore information related to the resultant share.

7. A non-transitory computer-readable recording medium storing a program for causing a computer to perform the secret exponent part uniforming method of claim 6.

* * * * *